No. 697,875. Patented Apr. 15, 1902.
F. PANSE.
ROTARY CUTTER.
(Application filed Jan. 11, 1902.)
(No Model.)

Witnesses:
H. C. Manning
Harry A. Knight

Inventor:
Friedrich Panse
By Hervey S. Knight
Attorney

UNITED STATES PATENT OFFICE.

FRIEDRICH PANSE, OF ESSEN, GERMANY, ASSIGNOR TO FRIED. KRUPP, OF ESSEN, GERMANY.

ROTARY CUTTER.

SPECIFICATION forming part of Letters Patent No. 697,875, dated April 15, 1902.

Application filed January 11, 1902. Serial No. 89,350. (No model.)

*To all whom it may concern:*

Be it known that I, FRIEDRICH PANSE, residing at Essen-on-the-Ruhr, Germany, have invented certain new and useful Improvements in Rotary Cutters, of which the following is a specification.

The present invention relates to a rotary cutter, and has for its object to increase the efficiency of such a device.
Most prominent among the rotary cutters heretofore known with respect to durability are those that are back-turned and provided with shaving-grooves; yet these cutters only permit of comparatively slight shaving strength and slow rate of advancement. Moreover, they present the difficulty when great efficiency is attempted of the cutter-shaft bending as it runs inward in the work and springing back during withdrawal, so that the surface is not evenly cut away and does not receive the desired form. These objections are overcome by the present invention, which consists, essentially, in having each of the cutter-sections which are curved backward at an angle separated by grooves running obliquely to the axis of the cutter and made up of a large number of cutter-teeth, while the teeth of one section lie displaced with respect to the teeth of a neighboring section, and the profile of said teeth corresponds to that of the cutter in a roughing-tool for lathes.

An embodiment of the invention in the form of a cylindrical rotary cutter in which the cutting-teeth are arranged spirally is shown in the accompanying drawings by way of example, in which drawings—

Figure 1:
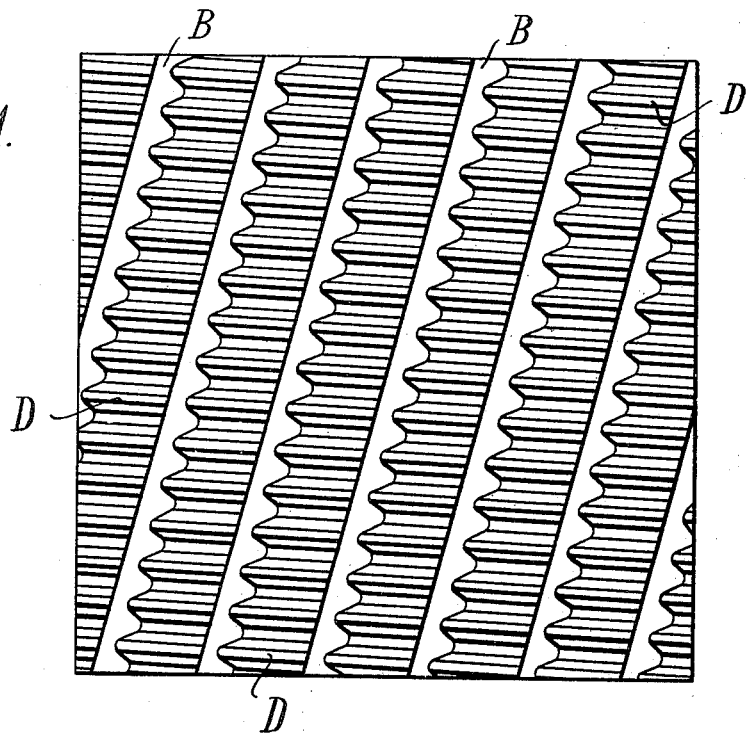
Figure 2:
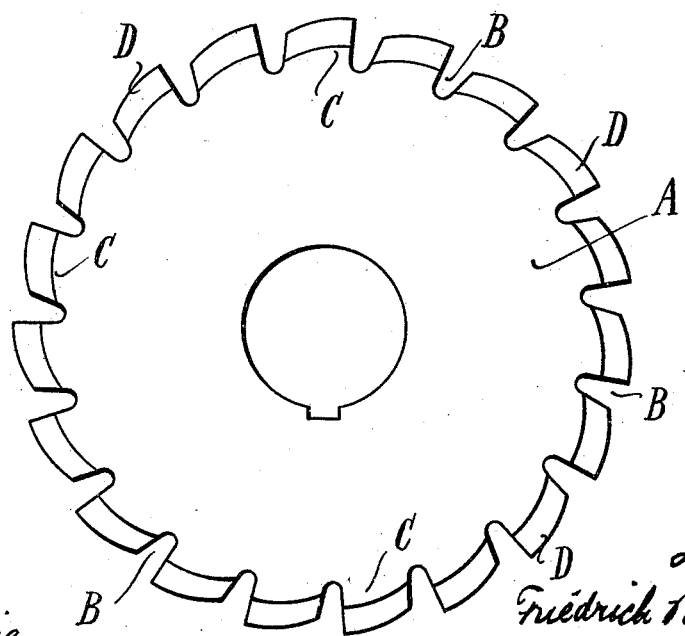

Figure 1 is a portion of the surface evolution of the cutter. Fig. 2 is a face view of the cutter.

In the surface of the cylindrical cutter-body A is cut a row of channels B, by which a like number of cutting-sections C are constructed. The latter are inclined backward or incurved slightly, and in them is cut, through the medium of the relieving-lathe, a thread of slow pitch, so that each section C is laid off into a large number of spiral ribs of approximately triangular or outwardly-tapering section, which form at their intersection with the channels B a large number of cutting-teeth D. The cross-section of these teeth, corresponding to that of the ribs, is substantially triangular or outwardly tapering with rounded apexes. In other words, the form of the teeth corresponds with that of a lathe-tool. The gradient of the teeth D with respect to the grooves B is such as to produce an effective cutting edge.

The described cutter is essentially different from those heretofore used, and the difference in effect of the two types of cutter is about the same as that existing between a roughing-tool and a broad parting-tool. In the cutter constructed according to the present invention each single tooth cuts out a narrow chip the length of which lies parallel to the direction of working, while the previously-used cutters with shaving-grooves cut a broad chip the length of which is perpendicular to the direction of working, with a materially-increased expenditure of work. In the one case the cutting of the longitudinal strips and in the other case the shearing of broad transverse strips is produced. Consequently with this invention, as has been established through experiments, the efficiency of the cutter is raised very highly, (approximately doubled,) and the machine, contrary to the violent vibration incident to imposing heavy work on cutters of the old type, works with extreme smoothness.

It is not indispensable to the essence of the invention that the several cutting-teeth be spirally arranged. It is sufficient if the teeth of one section be offset with respect to those of a neighboring section.

Cutters constructed in accordance with this invention are available for cutting plane as well as curved surfaces. The invention is also applicable to rotary profile cutters.

Having thus described the invention, the following is what is claimed as new therein:

1. A rotary cutter having its surface divided by oblique channels into cutting-sections, and each cutting-section being grooved to form a large number of inwardly-curved ridges of approximately triangular or outwardly-tapering section, forming at their intersection with the channels, cutting-teeth offset in one section with respect to those in a neighboring section.

2. A rotary cutter comprising a cylindrical body, cut with oblique channels dividing it into sections and intersecting circumferential spiral grooves of profile forming inwardly-curved ridges of outwardly-tapering cross-section; the intersection of said ridges with the channels forming outwardly-tapered cutting-teeth.

In testimony whereof I have hereunto set my hand in the presence of two subscribing witnesses.

FRIEDRICH PANSE.

Witnesses:
WILLIAM ESSENWEIN,
PETER LIEBER.